July 24, 1934.                J. C. CURTIS                1,967,499
ROCK DRILL
Filed Nov. 9, 1931

JOHN C. CURTIS
INVENTOR

BY *John E. Renfer*

ATTORNEY

Patented July 24, 1934

1,967,499

UNITED STATES PATENT OFFICE 1,967,499

ROCK DRILL

John C. Curtis, Cleveland, Ohio, assignor to The Cleveland Rock Drill Company, Cleveland, Ohio, a corporation of Ohio Application November 9, 1931, Serial No. 573,921

6 Claims. (Cl. 121—19)

This invention relates broadly to rock drill construction but is more particularly concerned with valvular mechanism for rock drills of the hammer type.

One object of this invention is to provide a rock drill with a valve which is relatively light and readily responsive to the effort of a compressed fluid.

Another object of this invention is to provide an arrangement of passage-ways within a fluid actuated machine which will facilitate the operative movement of the valve element.

Another object of this invention is to construct a valve mechanism which is positive in action, economical as to manufacture and in which the element subjected to wear or deterioration may be readily renewed or repaired.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combinations of parts and specific constructions indicative of the scope and spirit of the invention.

Figure 1:
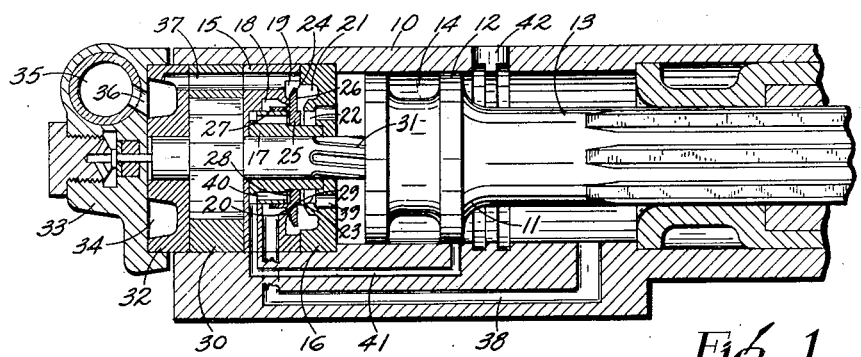
Fig. 1 is a longitudinal cross sectional view of a portion of a rock drill illustrating the invention.

Referring to the drawing in which like symbols designate corresponding parts throughout the several views, 10 represents the cylinder of a rock drill within which there is reciprocably mounted a piston 11 formed with an enlarged portion or head 12 and a restricted portion or stem 13. Intermediate its ends, the head 12 is formed with a circular recess 14 the purpose of which will be explained later.

Within the rear end of the cylinder 10, there is a valve block 15 mounted in abutting relation with a valve cap 16 which is adequately machined to snugly receive the restricted end portion of a bushing 17, the enlarged end portion of which is identically mounted within the valve block 15. Formed circumferentially of the bushing 17 and within the valve block 15, there are circular recesses 18 and 19 forming at their intersection a protuberant annular ledge or valve seat 20. The valve cap 16 is provided with two annular recesses 21 and 22 the partition of which is machined to form a protuberant annular valve seat 23 similar to the valve seat 20. The chamber 19 and recess 22 are oppositely disposed and in constant registration to form a supply chamber 24. Within the valve block 15 and slidably mounted upon but in fluid tight engagement with the bushing 17, there is a valve 25 provided with an enlarged circular flange 26, formed with two parallel faces. The valve 25 is provided with a tubular portion 27 extending within the recess 18 and affording internally of said portion an annular surface 28. Disposed on each side of the flange 26, there are two cylindrical portions or steps 29 the purpose of which will be explained later.

Disposed rearwardly of the valve block 15, there is a rotation mechanism comprising a ratchet ring 30 and rifled stem 31 extending through the bushing 17 into the piston 11 for imparting a rotary movement thereto. The bushing bore through which the rifle stem is admitted to the piston is of sufficient diameter to permit an annular opening therebetween preventing thereby any radial force to be imparted to the valvular mechanism during the operation of the machine. The rifle stem 31 and its appurtenance is maintained within the ratchet ring 30 by a bearing plate 32 which is maintained against the ratchet ring by a backhead 33 clamped to the cylinder 10 by a pair of bolts or side rods (not shown). The bearing plate 32 is formed with an enlarged annular recess 34 which is in constant registration with the throttle valve 35 disposed in the backhead 33 through an enlarged port 36 and in constant registration with the supply chamber 24 through a plurality of ports 37.

The recess 18 is connected to the front end of the cylinder by a plurality of ports 38 and the recess 22 to the rearward end of the cylinder through a plurality of ports 39.

Motive fluid may be admitted to the valve surface 28 by a plurality of ports 40 provided within the bushing 17, and the port 41 leading into the cylinder 10.

Figure 2:
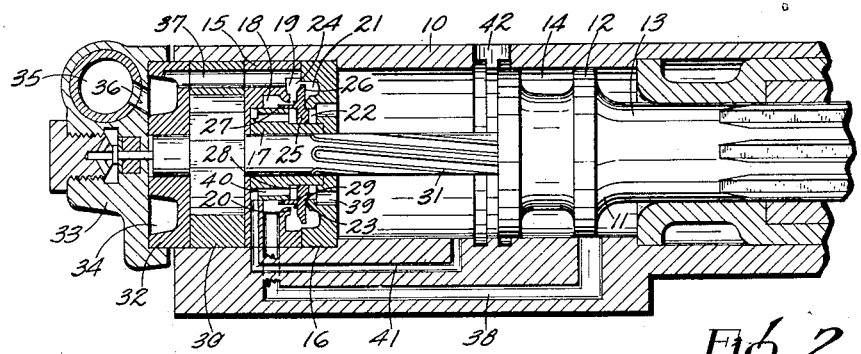
Fig. 2 and Fig. 3 are views similar to Fig. 1 illustrating parts in different position.

In the operation of the mechanism assuming the parts to be positioned as illustrated in Fig. 2, motive fluid will be admitted in the supply chamber 24 through the throttle valve 35, enlarged port 36, recess 34, and the plurality of ports 37. From the chamber 24 it will flow past the valve flange 26 into the recess 18 from where it will be admitted into the front end of the cylinder 10 through the plurality of ports 38 and will act upon the piston 11 to move it rearwardly.

Figure 3:
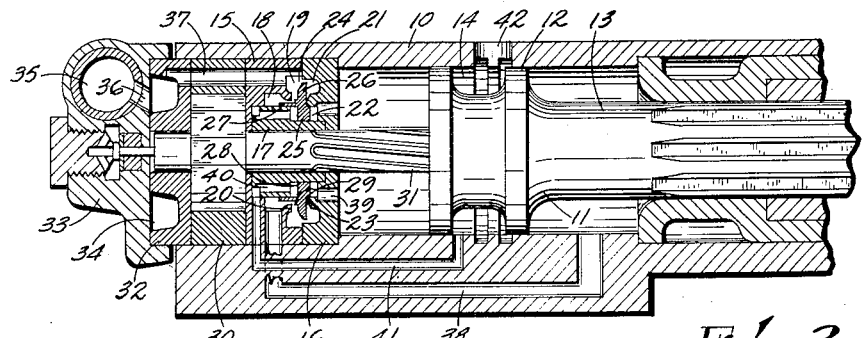

The valve 25 will be maintained in that position by motive fluid pressure exerted upon the outer end of the tubular portion 27 in co-operation with the pressure exerted upon the rearward face of the flange 26 within the chamber 24, said face having an exposed or actuating area somewhat larger than the forward face of the flange 26. Motive fluid within the rearward end of the cylinder as well as the motive fluid acting upon the valve annular surface 28 will exhaust to atmosphere through the passage 42 and ports 41 and 40. However after the piston is moved rearwardly sufficiently to cover the exhaust port 42, the motive fluid remaining upon the annular surface 28 would be entrapped thereupon. Consequently a venting port should be provided to overcome this difficulty and allow the valve to be kicked rearwardly. With this construction the auxiliary venting will take place when the piston is positioned as illustrated in Fig. 3. One end of the port 41 being connected to atmosphere through the piston annular recess 14 which is of sufficient length to allow the registration of the port 41 with the port 42 long enough to permit the complete escape of the motive fluid from the valve annular surface 28.

During its rearward movement the piston 11 will compress any motive fluid remaining within the rearward end of the cylinder thus exerting pressure within the recess 22 through the ports 39 and against the lower face of the valve 25. Consecutively the motive fluid being admitted in the forward end of the cylinder will effect a drop of pressure within the recess 18 or upon the outer end of the tubular portion 27 thus the compression exerted upon the lower face of the valve will overcome such pressure and kick the valve rearwardly or in the position illustrated in Fig. 1.

With the valve in the rearward position, motive fluid will flow around the valve into the recess 22 and within the rear end of the cylinder through the plurality of ports 39 to act upon the piston 11 and drive it forwardly. The valve will be maintained in that position by motive fluid exerting pressure upon the lower face thereof. However after the piston has traveled a sufficient distance to uncover the port 41, motive fluid will be admitted to the valve annular surface 28 through the ports 41 and 44, tending to throw the valve forwardly. During its forward displacement and prior to the delivery of its blow upon the cutting tool, the piston will compress any fluid remaining in the forward end of the cylinder which will be admitted within the recess 18 through ports 38 and will act on the outer end of the tubular portion 27. That pressure in cooperation with the pressure exerted upon the annular surface 28 and the drop of pressure occurring on the lower face of the valve when the piston finally opens the rearward end of the cylinder to atmosphere, will throw the valve forwardly.

Attention is directed to the fact that motive fluid is never admitted within the front and rear end of the cylinder at the same time. The steps or cylindrical shoulders 29 disposed on each side of the valve flange 26 will be concurrently engaged with a portion of the internal cylindrical wall of the recesses 18 and 22 when the valve is shifted from one position to the other, thus preventing the motive fluid to flow past each side of the flange 26 into the recesses 18 and 22.

Although the foregoing description is necessarily of a detailed character in order to completely set forth the invention it is to be understood that the specific terminology employed is not intended to be restrictive or confining, and it is further understood that various re-arrangements of parts and modifications of structural details may be resorted to without departing from the scope and spirit of the invention as herein claimed.

I claim:

1. In a rock drill, a cylinder having an exhaust passage, a piston reciprocably mounted within said cylinder being formed of an enlarged and restricted portion, an annular groove within said enlarged portion, a valve block having a supply chamber in constant registration with the motive fluid source of supply, a valve reciprocably mounted within said valve block, a flange on said valve extending within said supply chamber, unitary actuating and holding area on the forward side of said flange alternatively subjected to compressed fluid from said cylinder to actuate said valve and to motive fluid from said supply chamber to hold said valve in one position, actuating and holding areas on the other side of said flange to move and maintain said valve in the other position, and unitary means for admitting and exhausting motive fluid to and from said last mentioned actuating area, said means being controlled by the piston for admitting and by said annular groove for exhausting said motive fluid.

2. In a rock drill, a cylinder having a piston reciprocable therein, a valve block, a valve slidably mounted therein comprising a tubular portion and a flange, opposite annular valve seats for said valve, unitary area on the forward end of said flange for actuating and holding said valve to permit the motive fluid to flow to the rearward end of the cylinder, holding areas on the other side of said flange and on the end of said tubular member for maintaining said valve in the other position to allow motive fluid to flow to the forward end of the cylinder, and an actuating area within said tubular portion for actuating said valve into said last mentioned position.

3. In a rock drill, a cylinder having a piston reciprocable therein, a valve block having opposed annular valve seats and a motive fluid supply chamber in constant registration with the motive fluid source of supply, a valve slidably mounted within said block comprising a flange engageable with said seats, a cylindrical portion on each side of said flange, actuating surfaces within said valve for actuating the same, ports and passages leading from said cylinder to said actuating surfaces, passages for conveying motive fluid from said supply chamber around said valve to said cylinder, and means whereby said cylindrical portions will be engaged with said valve block when said flange is shifted from one seat to the other, preventing thereby the escape of motive fluid around each side of said flange to each end of said cylinder.

4. In a rock drill, a cylinder having a piston reciprocable therein, a valve block, opposed annular valve seats, a valve reciprocably mounted between said seats, one side of said valve constituting one area alternately subjected to the action of the compressed fluid from said cylinder for shifting said valve into one position and to the action of the motive fluid for holding said valve into said one position, the other side of said valve constituting a shifting area and a holding area opposed to said first mentioned area and subjected to the action of the motive fluid for shifting and holding said valve in the other position, and means preventing motive fluid admitted on said shifting area to flow on said holding area, the end of said means constituting an auxiliary area subjected to the action of the motive fluid admitted on said holding area.

5. In a rock drill, a cylinder having a piston reciprocable therein, a valve block, opposed annular valve seats, a disk like valve reciprocably mounted between said seats, one side of said disk having an area subjected to the action of the pressure fluid for shifting and holding said valve in one position, a shifting area and a holding area on the other side of said disk alternatively subjected to the action of the motive fluid for shifting and holding said valve in the other direction, and a sleeve like portion extending from said last mentioned side of said disk for separating said shifting area from said holding area.

6. In a rock drill, a cylinder having a piston reciprocable therein, a valve block, a valve slidably mounted therein comprising a tubular portion and a flange, opposed annular valve seats for said flange, one side of said flange constituting an area subjected to the action of the pressure fluid for shifting and holding said flange on one of said seats, an actuating area within said tubular portion subjected to the action of the pressure fluid for actuating said flange on the other of said seats, a holding area on the other side of said flange subjected to the action of the pressure fluid for holding said flange on said last mentioned seat, and means controlled by said piston for admitting and exhausting pressure fluid to and from said actuating area.

JOHN C. CURTIS.